United States Patent
Park et al.

(10) Patent No.: US 12,541,824 B2
(45) Date of Patent: Feb. 3, 2026

(54) IMAGE PROCESSING METHOD AND APPARATUS FOR REDUCING NOISE OF IMAGE OBTAINED BY RADIOGRAPHY

(71) Applicant: DRTECH CORPORATION, Seongnam-si (KR)

(72) Inventors: June Kyu Park, Seoul (KR); Choul Woo Shin, Seongnam-si (KR); Young Gi Yu, Gwacheon-si (KR)

(73) Assignee: DRTECH CORPORATION, Seongnam-si (KR)

(*) Notice: Subject to any disclaimer, the term of this patent is extended or adjusted under 35 U.S.C. 154(b) by 511 days.

(21) Appl. No.: 18/164,342

(22) Filed: Feb. 3, 2023

(65) Prior Publication Data

US 2023/0385989 A1    Nov. 30, 2023

(30) Foreign Application Priority Data

May 27, 2022  (KR) .......................... 10-2022-0065653

(51) Int. Cl.
  *G06T 5/00*    (2024.01)
  *G06T 5/50*    (2006.01)
  (Continued)

(52) U.S. Cl.
  CPC .................. *G06T 5/70* (2024.01); *G06T 5/50* (2013.01); *G06T 7/254* (2017.01); *G06T 2207/10116* (2013.01); *G06T 2207/20224* (2013.01)

(58) Field of Classification Search
  CPC .. G06T 5/70; G06T 5/50; G06T 7/254; G06T 2207/10116; G06T 2207/20224; G06T 2207/10124; G06T 2207/20182; G06T 2207/20201; G06T 2207/20221; G06T 2207/30008; G06T 7/246; G06T 7/13;
  (Continued)

(56) References Cited

U.S. PATENT DOCUMENTS

| 5,467,380 | A | 11/1995 | De Jonge et al. |
| 6,151,417 | A | 11/2000 | Florent |
| 7,106,894 | B1 | 9/2006 | Boutenko |

FOREIGN PATENT DOCUMENTS

| CN | 101296315 A | 10/2008 |
| CN | 103366569 A * | 10/2013 |

(Continued)

*Primary Examiner* — Mekonen T Bekele
(74) *Attorney, Agent, or Firm* — Rabin & Berdo, P.C.

(57) ABSTRACT

An image processing apparatus is configured to perform noise reduction on an image obtained by radiography in a recursive way includes: an image input unit receiving frame-by-frame images obtained by the radiography; a motion detection image generating unit configured to generate a motion detection image comprising motion detection information for each pixel of a subtraction image obtained by a subtraction of a current frame image and a previous frame image; a motion probability image generating unit configured to generate a motion probability image based on the generated motion detection image and the motion detection image accumulated up to a previous frame; and an output image generating unit configured to generate an output image of a current frame by mixing the current frame image and the output image of the previous frame based on the motion probability image.

25 Claims, 10 Drawing Sheets

(51) Int. Cl.
    *G06T 5/70*     (2024.01)
    *G06T 7/254*     (2017.01)
(58) Field of Classification Search
    CPC . G06T 2207/10016; G06T 2207/20032; G06T 2207/20192
    See application file for complete search history.

(56) References Cited

FOREIGN PATENT DOCUMENTS

| | | | |
|---|---|---|---|
| CN | 104796581 A | * | 7/2015 |
| JP | 2009-189440 A | | 8/2009 |
| JP | 6002324 B2 | | 10/2016 |
| JP | 6744440 B2 | | 8/2020 |
| KR | 10-1432864 B1 | | 8/2014 |
| KR | 101795663 81 | | 11/2017 |
| KR | 1020210103440 A | | 8/2021 |

* cited by examiner

FIG. 9A
FIG. 9B

FIG. 9C
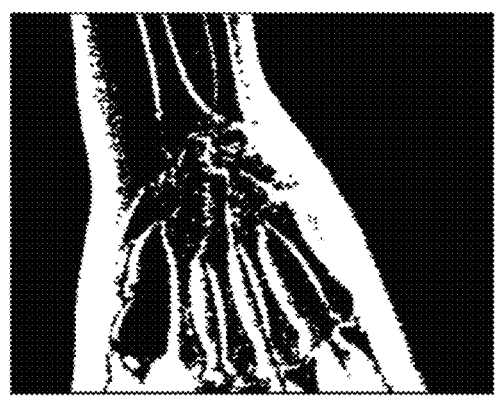
FIG. 10
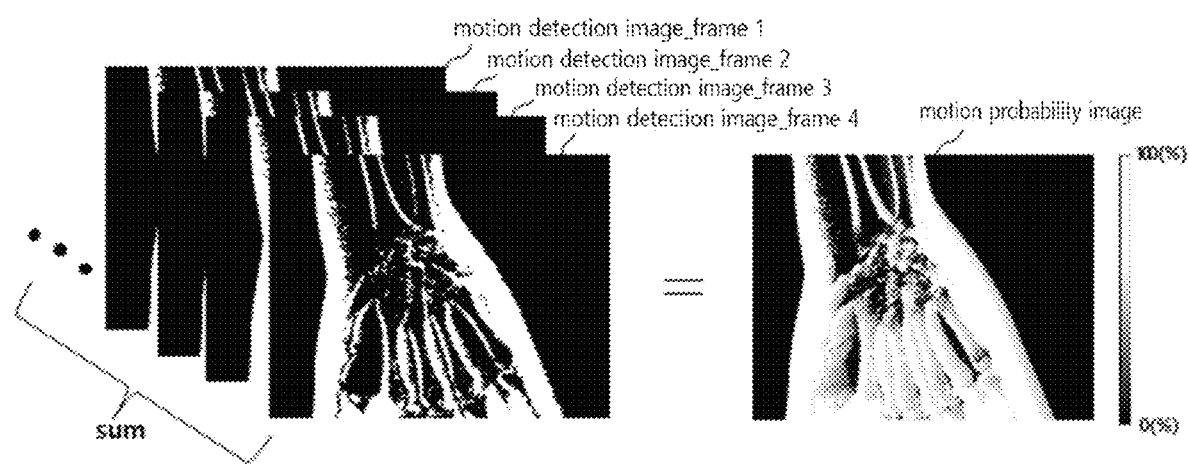

IMAGE PROCESSING METHOD AND APPARATUS FOR REDUCING NOISE OF IMAGE OBTAINED BY RADIOGRAPHY

TECHNICAL FIELD

The present invention relates to an image processing method and apparatus for reducing noise included in an image obtained by radiography.

BACKGROUND ART

Various medical diagnoses and treatments are performed based on images captured by a radiographic apparatus using radiation such as X-rays. In general, medical images obtained using X-rays include not only anatomical information of a subject, that is, a human body, but also noises generated according to an imaging environment, a device performance and the like. These noises degrade the image and cause deterioration of the anatomical diagnostic ability of the patient. The degree of deterioration of an image is determined by various factors, for example, image deterioration due to noise of the sensor itself and image deterioration due to noise generated according to the X-ray dose.

Meanwhile, when exposed to radiation generated during X-ray imaging for a long time, side effects due to radiation exposure may occur. For this reason, it is required to take an X-ray image by irradiating a low-dose X-ray in order to minimize radiation exposure. However, in the case of imaging by irradiating a low-dose X-ray, as the photon density of the incident X-ray decreases, the density of the quantum mottle becomes much larger, resulting in a problem in that image quality deteriorates.

For these reasons, several methods have been introduced to effectively remove noise from acquired images while using low-dose X-rays. For example, in Korean Patent Registration No. 10-1432864, a noise component image is obtained through thresholding and reduction processing on a subtraction image obtained by a subtraction between a current frame image and a previous frame image, and an output image of a current frame is obtained by adding this to the current frame image and stores a noise-reduced output image in a memory, thereby realizing a noise reduction technique through a recursive filtering.

However, although the noise reduction technology using the recursive filtering method is very effective in removing a line noise and being applied to a stationary subject without movement, this method has a problem in that a noise reduction performance deteriorates as the motion increases and in particular a problem of degrading the quality of an image in which motion blur occurs when the movement of a subject is incorrectly determined. Therefore, in the recursive filtering method, it is very important to set a threshold value for discriminating motion and noise of a subject in a subtraction image between a current frame and a previous frame. In the above-mentioned Korean Patent Registration No. 10-1432864, if the absolute value of each pixel of the subtraction image exceeds a predetermined threshold with a value larger than the standard deviation of the noise, it is determined that there is a motion of the subject, otherwise there is no motion of the subject. However, due to the characteristics of X-ray images, the noise intensity and deviation vary greatly depending on the dose condition, a density of a subject, and a degree of a motion of a subject during imaging, so the threshold range also increases, and thus there is a difficulty in setting an appropriate threshold value. In addition, when there is a motion of a subject, the effect of the recursive filtering is suppressed, and the noise reduction effect is also deteriorated.

PRIOR ART DOCUMENTS

Korean patent registration No. 10-1432864 (2014.08.26)
Japanese patent registration No. 6744440 (2020.08.19)

DISCLOSURE OF INVENTION

Technical Problem

An object to be solved by the present invention is to provide a method for increasing the accuracy of a motion discrimination by reducing and stabilizing noise deviations to determine an appropriate threshold value in order to determine whether a subject moves in a subtraction image.

In addition, another object to be solved by the present invention is to provide a method for effectively reducing noise by using a motion probability image obtained by time-by-time accumulating images subjected to noise reduction processing based on motion discrimination results.

Technical Solution

An image processing apparatus according to an embodiment of the present invention is configured to perform noise reduction on an image obtained by radiography in a recursive way includes: an image input unit receiving frame-by-frame images obtained by the radiography; a motion detection image generating unit configured to generate a motion detection image comprising motion detection information for each pixel of a subtraction image obtained by a subtraction of a current frame image and a previous frame image; a motion probability image generating unit configured to generate a motion probability image based on the generated motion detection image and the motion detection image accumulated up to a previous frame; and an output image generating unit configured to generate an output image of a current frame by mixing the current frame image and the output image of the previous frame based on the motion probability image.

The motion probability image generating unit may generate the motion probability image by summing the motion detection image of the present frame and at least one of the motion detection images up to the previous frame, and the output image generating unit may variably determine a mixing ratio between the current frame image and the previous frame image depending on a value indicating a degree of a motion of each pixel of the motion probability image.

The mixing ratio may be determined such that a reflection ratio of the current frame image compared to the previous frame image increases as the degree of the motion represented by each pixel value of the motion probability image increases.

The output image generating unit may generate the output image by mixing the current frame image and the previous frame image in corresponding pixel units depending on the value of each pixel of the motion probability image.

In another embodiment of the present invention, the image processing apparatus may further include a noise reducing unit configured to perform a noise reduction processing on the current frame image and the previous frame image.

The noise reducing unit may perform the noise reduction processing in a unit of a mask having a plurality of adjacent pixels, and the noise reducing unit may be configured to perform the noise reduction processing based on a combination having the smallest sum of absolute values of a difference between a center pixel and adjacent pixels among combinations of the center pixel of the plurality of the pixels and the adjacent pixels neighboring the center pixel in a predetermined direction.

In another embodiment of the present invention, the image processing apparatus may further include a noise stabilizing unit is configured to perform a noise stabilization by reducing a noise deviation between the current frame image on which the noise reduction process is performed and the previous frame image.

The noise stabilizing unit may be configured to perform the noise stabilization by converting the current frame image and the previous frame image to have Gaussian distribution characteristics.

The noise stabilizing unit may be configured to perform the noise stabilization through a conversion that reduces the noise deviation.

In another embodiment of the present invention, the image processing apparatus may further include: a noise reducing unit that is configured to perform a noise reduction processing on the current frame image and the previous frame image; and a noise stabilizing unit that is configured to perform a noise stabilization by reducing a noise deviation between the current frame image on which the noise reduction process is performed and the previous frame image. The motion detection image generating unit may include: a subtraction image generating unit that is configured to generate a subtraction image by a subtraction of the current frame image and the previous frame image; and a thresholding unit that is configured to generate the motion detection image including the motion detection information of each pixel through thresholding on the pixel values of each pixel of the subtraction image.

The thresholding unit may be configured to perform thresholding of the motion detection image through an adaptive threshold value whose size varies depending on the size of a pixel value of each pixel of the subtraction image.

The thresholding unit may be configured to perform the thresholding in units of masks including a plurality of pixels.

The motion detection image generating unit may be configured to remove noise by separating a subject and a background region from the generated motion detection image and then excluding the background region from the motion detection image.

The motion detection image generating unit may be configured to distinguish between the subject and the background region and to generate a subject motion detection image for the subject and a background region motion detection image for the background region through thresholding with different threshold values, and then may be configured to generate the motion detection image by merging the subject motion detection image and the background region motion detection image.

According to an embodiment of the present invention, an image processing method for performing noise reduction on an image obtained by radiography in a recursive way includes: receiving frame-by-frame images obtained by the radiography; generating a motion detection image comprising motion detection information for each pixel of a subtraction image obtained by a subtraction of a current frame image and a previous frame image; generating a motion probability image based on the generated motion detection image and the motion detection image accumulated up to a previous frame; and generating an output image of a current frame by mixing the current frame image and the output image of the previous frame based on the motion probability image.

Advantageous Effect of Invention

According to the present invention, an image with reduced noise can be generated using a motion probability image.

BRIEF DESCRIPTION OF DRAWINGS

FIGS. 9A to 9C show an example of a motion detection image output when the hand phantom is moved from right to left in the previous frame image and the current frame image.

FIG. 10 is a diagram illustrating a method of generating a motion probability image using a motion detection image.

DETAILED DESCRIPTION FOR CARRYING OUT INVENTION

Hereinafter, with reference to the accompanying drawings, embodiments of the present invention will be described in detail so that those skilled in the art can easily practice the present invention. However, the present invention may be embodied in many different forms and is not limited to the described embodiments.

Figure 1:
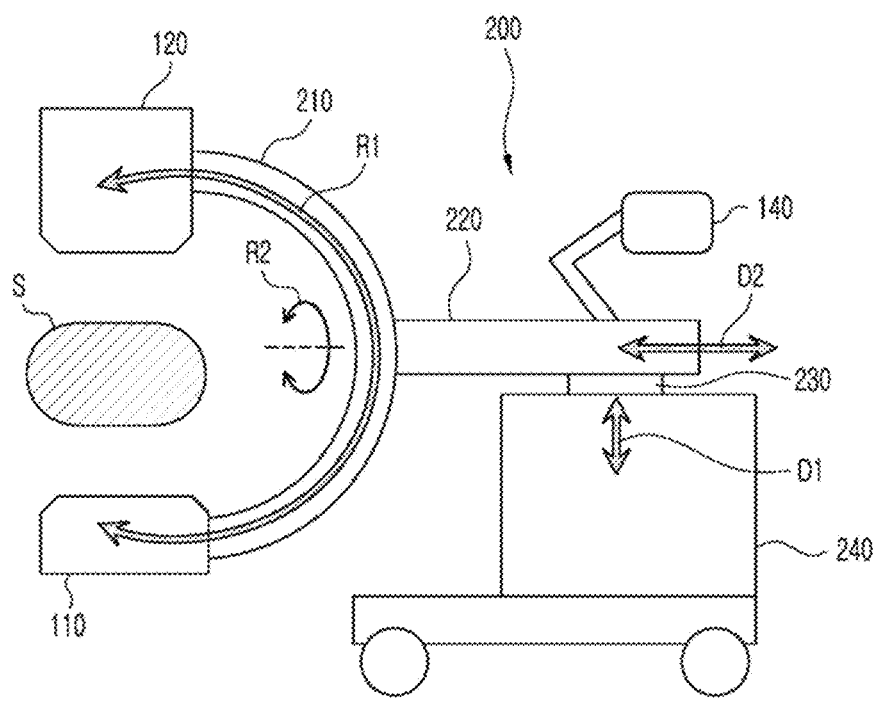
FIG. 1 is a diagram schematically illustrating an example of a C-arm type radiation imaging apparatus to which an image processing apparatus according to an embodiment of the present invention is applied.

FIG. 1 shows an example of a C-arm type radiation imaging apparatus to which an image processing apparatus having a noise reduction function according to an embodiment of the present invention is applied. An image processing apparatus according to an embodiment of the present invention may be applied as a part of an imaging apparatus as exemplarily shown in FIG. and may also be configured as a separate device from the imaging apparatus to perform a imaging processing.

An imaging apparatus to which an image processing apparatus according to an embodiment of the present invention can be applied may be configured in the form of a C arm as shown in FIG. 1 to obtain moving images and may be configured to capture a region of interest of the subject S, which is an imaging target, using radiation such as X-rays.

Referring to FIG. 1, the radiation imaging apparatus includes a radiation emitting unit 110 that outputs radiation, e.g., X-rays, and an image acquiring unit 120 that acquires image data by receiving radiation that has passed through a subject S. The radiation emitting unit 110 and the image acquisition unit 120 may be supported on both ends of a C-arm 210. For example, the radiation imaging apparatus may be applied to a mobile C-arm X-ray imaging device, an interventional X-ray device, an interventional angiography C-arm X-ray device, etc.

A support structure 200 supports the radiation emitting unit 110 and the image acquiring unit 120, and is configured to be able to change the spatial position and the rotational position of the radiation emitting unit 110 and the image acquiring unit 120 to change the imaging position and angle of the object S. For example, the support structure 200 may include a support body 240, a lift column 230 coupled to the support body 240 so as to be movable in a vertical direction D1, and a forward and backward arm 220 that is movable in a vertical direction together with the lift column 230 and is connected to the lift column 230 to be relatively movable in a horizontal direction D2 with respect to the lift column 230.

The C-arm 210 is connected to the forward and backward arm 220 so as to be relatively rotatable in at least one rotational direction with respect to the forward and backward arm 220, and the radiation emitting unit 110 and the image acquiring unit 120 are respectively connected to both ends of the C-arm 210 are respectively. At this time, the C-arm 210 may be connected to the forward and backward arm 220 to be able to undergo a up/down movement in a vertical direction and a forward/backward movement in a horizontal direction and also to be relatively rotatable with respect to the forward and backward arm 220 in at least one rotational direction, for example, in at least one rotational direction among an orbital rotation direction R1 and an axial rotation direction R2 centered on a direction parallel with a horizontal movement direction of the forward and backward arm 220. Although not shown in the drawings, the support structure 200 may include actuators such as motors for the upward/downward movement of the lift column 230, the horizontal movement of the forward and backward arm 220, and the rotation of the C-arm 210. Members for supporting and actuating the C-arm 210 that supports the radiation emitting unit 110 and the image acquiring unit 120, that is, the forward and backward arm 220 and the lift column 230, and actuators provided thereto may be referred to as a driving element for driving the C-210, and the combination of these members may be referred to as a driving unit for driving the C-arm 210. Also, it is configured such that a panning rotation of the C-arm 210 may be possible through a horizontal rotation of the forward and backward arm 220. The shape of the support member is not limited to the C-shape, and in other embodiments of the present invention, instead of the C-shape, a U-shape or G-shape arm may be used as the support member.

A display unit 140 is configured to display at least one of real-time location information, image data, reference location information, and radiation emitting information. The display unit 140 may be any device capable of displaying information and images, for example, a printer, a CRT display, an LCD display, a PDP display, an OLED display, a FED display, an LED display, a DLP display, a PFD display, a 3D display, a transparent display or the like. Also, the display unit 140 may be implemented in a form capable of displaying and inputting information such as a touch screen capable of receiving input from a user.

An image processing apparatus 10 according to an embodiment of the present invention may be implemented in the form of an information processing device such as one or a plurality of computers capable of processing and calculating information. For example, a computer may include a control means such as a CPU, a storage means such as a read only memory (ROM) or a random access memory (RAM), and a graphics control means such as a graphics processing unit (GPU). A computer may also include communication means such as a network card, input/output means such as a keyboard, a display or a touch screen. Components of such a computer can be connected via a bus as is known and can be operated and controlled by an execution of a program stored in a storage means.

The image processing apparatus 10, which may be implemented in the form of a computer capable of processing information, may be installed in the radiation imaging apparatus shown in FIG. 1, and may be configured to receive and process the photographed images and to display the processed image on the image display unit as a part of the radiation imaging apparatus.

Figure 2:
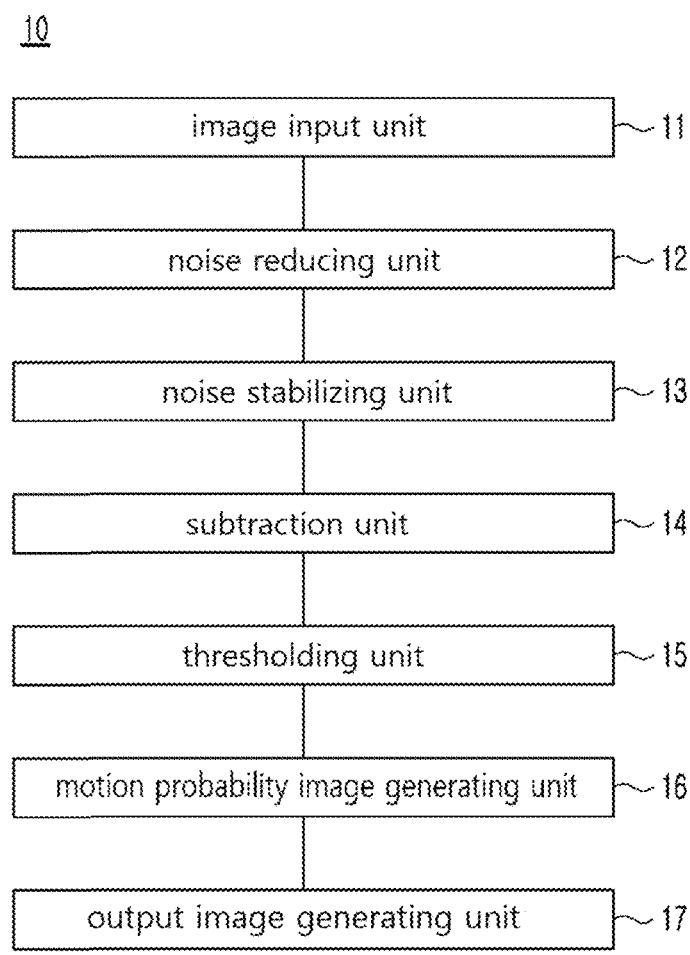
FIG. 2 is a block diagram of an image processing apparatus according to an embodiment of the present invention.

Meanwhile, referring to FIG. 2, the image processing apparatus 10 according to an embodiment of the present invention includes a plurality of functional components for noise reduction processing, that is, an image input unit 11, a noise reducing unit 12, and a noise stabilizing unit 13, a subtraction unit 14, a thresholding unit 15, a motion probability image generating unit 16, and an output image generating unit 17. At this time, a motion detection image is generated by the continuous action of the subtraction unit 14 and the thresholding unit 15, and in this sense, the subtraction unit 14 and the thresholding unit 15 may be regarded as a motion detection image generation unit.

Figure 3:
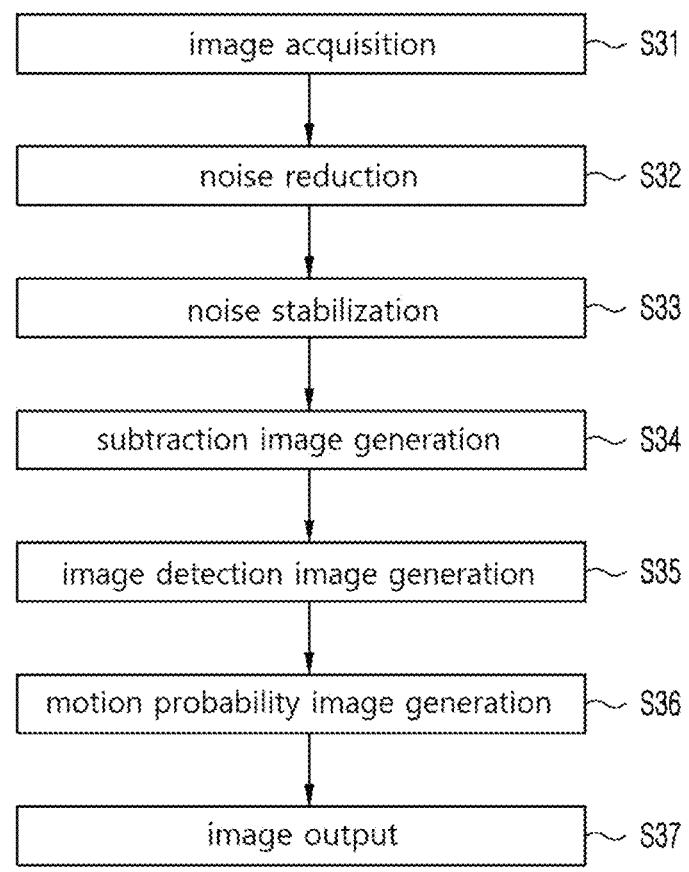
FIG. 3 is a flowchart of an image processing method according to an embodiment of the present invention.

Referring to FIG. 3, the image processing method performed by the image processing apparatus 10 may include an image acquisition step S31, a noise reduction step S32, a noise stabilization step S33, and a subtraction image generation step S34, a motion detection image generation step S35, a motion probability image generation step S36, and an image output step S37. The image processing method generates an output image with reduced noise through a recursive way, and the applicant calls this recursive way applied in the present invention an infinite recursive depth.

The image input unit 11 receives an input image 21 from the outside. For example, the image input unit 11 may sequentially receive each frame of a video acquired by the image acquisition unit 120 as described above. An image composed of a plurality of pixels of an area including a subject may be acquired as a radiation video sequence according to time by the image acquisition unit 120, which is a radiation detection panel, and the obtained radiation video sequence can be input to the image input unit 11 sequentially in chronological order.

The input image 21 may be one frame of a video consisting of a plurality of frames. In addition, the input image 21 may be a two-dimensional image having a plurality of pixels including a plurality of rows (n rows) and a plurality of columns (m columns), and may include noises along with a photographed subject. For example, the noise included in the input image 21 may include a line noise in a predetermined direction, for example, a horizontal direction and/or a vertical direction and a random noise.

The noise reducing unit 12 reduces noise of the frame image. The noise reducing unit 12 may perform noise reduction by removing high-frequency noise components from an image using a low-pass filter. Noise reduction processing may be performed on the current frame image and the previous frame image respectively.

Figure 4:
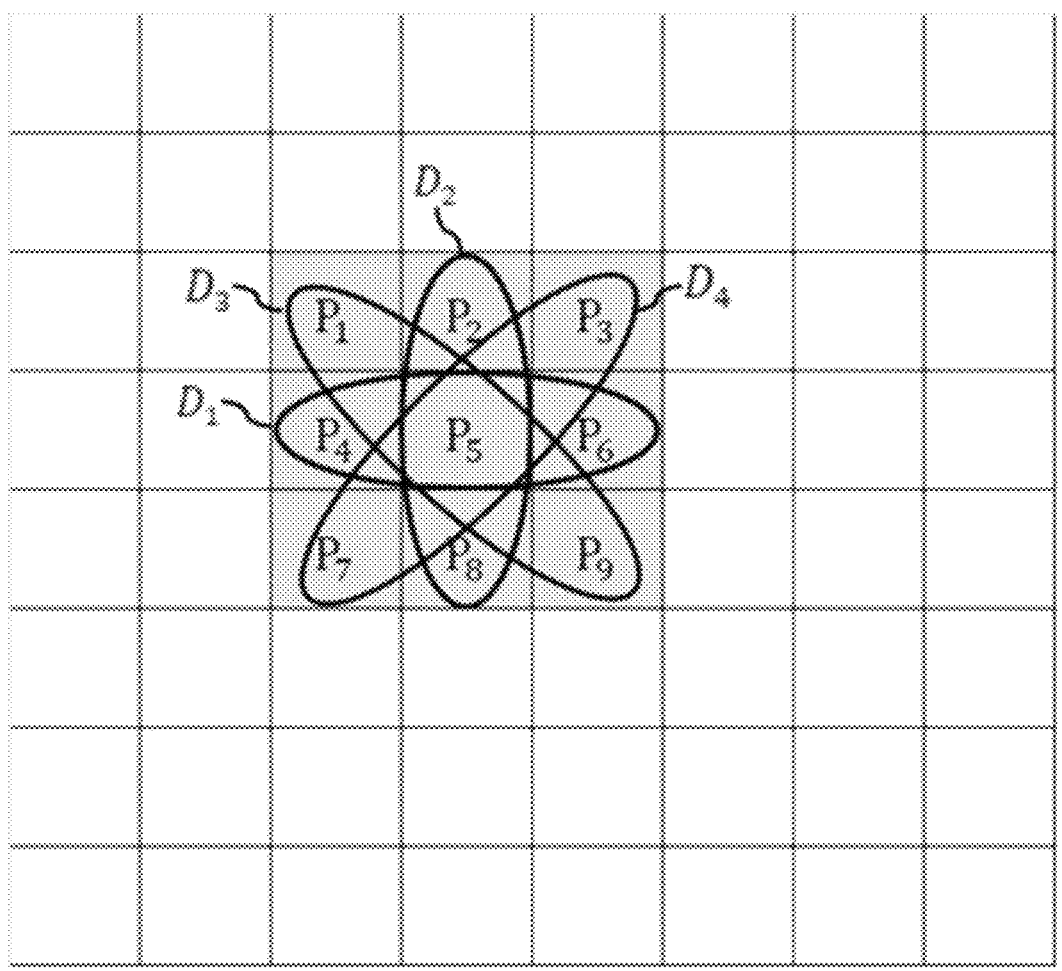
FIG. 4 is a diagram for explaining a process of performing noise reduction in an image processing method according to an embodiment of the present invention.

FIG. 4 is a drawing for explaining a process of performing noise reduction processing on a pixel-by-pixel basis, and specifically, for explaining a method of reducing noise in a center pixel located at the center of a 3×3 pixel mask and updating it to a noise-reduced pixel value. This noise reduction method can be applied equally to all pixels in a frame image.

Referring to FIG. 4, first, the absolute values of the differences between the pixel values of the center pixel $P_5$, which is a target pixel for noise reduction, and arbitrary two pixels $P_i$ and $P_j$ among the pixels $P_1$ to $P_9$ adjacent to the center pixel $P_5$ and the center pixel $P_5$ are added to obtain the sum $D_k$ of the differences. The adjacent pixels to be selected and a direction to be selected may be appropriately determined according to needs and requirements. For example, referring to FIG. 4, for the four directions indicated by an ellipse with respect to the center pixel $P_5$, the sums of absolute values of differences between two pixels in the corresponding direction and the center pixel $P_5$ are respectively calculated. That is, the sum $D_1$ of absolute values of differences between the pixel values of the central pixel $P_5$ and the adjacent pixels $P_4$ and $P_6$ in the horizontal direction, the sum $D_2$ of absolute values of differences between the pixel values of the central pixel $P_5$ and the adjacent pixels $P_2$ and Pa in the vertical direction, the sum $D_3$ of absolute values of differences between the pixel values of the central pixel $P_5$ and the adjacent pixels $P_1$ and $P_9$ in the oblique direction inclined to the left, and the sum $D_4$ of absolute values of differences between the pixel values of the central pixel $P_5$ and the adjacent pixels $P_3$ and $P_7$ in the oblique direction inclined to the right are respectively calculated.

In this case, pixels in the direction in which the sum $D_k$ of the absolute values of the differences is smaller may be considered as pixels having a directionality most similar to the central pixel $P_5$. Since impulse noise can be regarded as a pixel having a particularly large absolute value compared to neighboring pixels, in order to exclude this, a direction having the smallest sum of absolute values of differences in pixel values among a plurality of directions $D_1$ to $D_4$ is selected and the pixel value of the center pixel is corrected using the values of the pixels included in the selected direction to be updated to a pixel value with reduced noise. For example, in FIG. 4, when the sum of absolute values of differences between pixel values calculated for pixels in the horizontal direction is the smallest among the four sums of the absolute values, a weight for the center pixel $P_5$ is determined and the pixel value of is the center pixel $P_5$ is updated using the determined weight. For example, the pixel value of the central pixel $P_5$ may be replaced with an average value or a median value of the three pixels $P_4$, $P_5$, and $P_6$. By sequentially updating the pixel values of the central pixel in this way while moving the mask, noise can be reduced through the update of the pixel values.

In an embodiment of the present invention, since instead of correcting the pixel value of a center pixel based on the pixel values of all pixels in the mask including the center pixel, a direction having the smallest sum of the absolute values of the difference between the center pixel and the pixels belong thereto is selected and the pixel value of the center pixel is corrected using the pixel values of the pixels belonging to the selected direction, noise reduction can be achieved and at the same time the edge component can be prevented from being weakened by the application of the center value or average value filter. That is, in case that the center pixel is a component corresponding to an edge, when the pixel value of the center pixel is corrected by applying an average or median filter to all pixels surrounding the center pixel, there is a problem of a substantial reduction of an edge component, but in an embodiment of the present invention, since the pixel value of the center pixel is corrected using only the pixels in the direction having most similar directionality to the center pixel, it is possible to prevent the characteristic from being damaged due to a large decrease in edge components.

Thus, a subsequent motion detection may be robust due to this preprocessing through the noise reducing unit 12 as described above.

The noise stabilizing unit 13 stabilizes the noise by reducing the difference between the noises of the current frame image and the previous frame image in which the noises are reduced.

Since the amount of photons incident on each sensor to acquire a radiation image, for example, an X-ray image, appears randomly rather than being constant over time and is independent, the noise characteristics of an X-ray image generally follows a Poisson distribution. In an embodiment of the present invention, in order to remove noise having a Poisson distribution characteristic, noise having a Gaussian distribution characteristic is approximated through an Anscombe transform. Since the Anscombe transform is approximated to a Gaussian distribution approaching standard deviation 1, the transformed data has a stable noise deviation.

Figure 8:
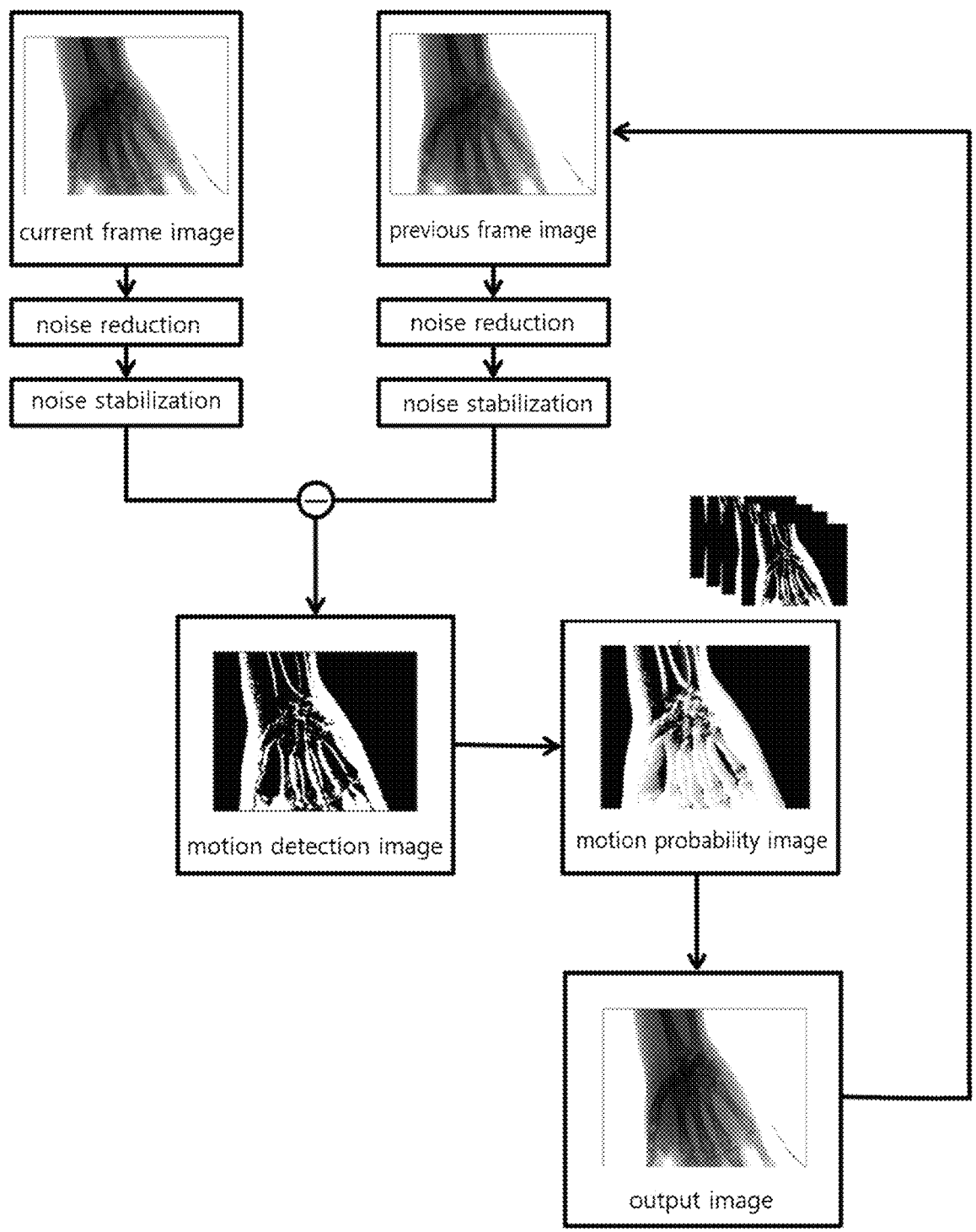
FIG. 8 is a diagram schematically showing an algorithm of an image processing method according to an embodiment of the present invention.

In the above manner, as shown in FIG. 8, noise reduction and noise stabilization may be respectively performed on the current frame image and the previous frame image, for example, the output image of the previous frame.

Next, a motion detection image is generated through the subtraction image generation by the subtraction unit 14 and the thresholding processing of the subtraction image by the thresholding unit 15. Accordingly, as shown in FIG. 8, a motion detection image may be generated from a noise-processed current frame image and a noised-processed previous frame image, for example, an output image of the previous frame. In this context, the motion detection image is obtained from an image obtained by subtracting the previous frame image from the current frame image, and this means that the motion detection image includes information on whether each pixel moves or not. For example, in a motion detection image, a pixel with motion may be set to have a value of '0' and a pixel without motion may be set to have a value of '1'. That is, all pixels in the motion detection image have a pixel value of 0 or 1, and pixels with a value of 0 indicate motion relative to the previous frame image and pixels with a value of 1 indicate no motion relative to the previous frame image.

The subtraction unit 14 generates a subtraction image by subtracting a current frame image subjected to noise processing, that is, noise reduction and noise stabilization processing, and a previous frame image, for example, an output image of the previous frame. The difference unit 14 may generate a subtraction image by calculating a difference of a pixel value of each pixel at the same location for all pixels between the current frame image and the previous frame image.

The subtraction image may include motion information of a subject and residual noise information. Additionally, the subtraction image may be stabilized by using an average value filter or a median value filter on the generated subtraction image.

The thresholding unit 15 may determine a threshold for motion detection of the subtraction image and perform thresholding based on the determined threshold to detect motion of each pixel and generate a motion detection image accordingly. If the threshold for motion detection is set too low, motion detection sensitivity increases and thus the level of noise reduction decreases. On the other hand, if the threshold for motion detection is set too high, motion detection sensitivity may be lowered and thus motion blur (dragging phenomenon) may occur. Since X-ray images are acquired under different dose conditions and subject characteristics, it is difficult to predict the pixel values of the acquired images, and it is necessary to set an appropriate threshold value according to the pixel values. In an embodiment of the present invention, since a subtraction image is generated after noise stabilization, it is particularly advantageous in determining a threshold value for determining motion.

Figure 5A:
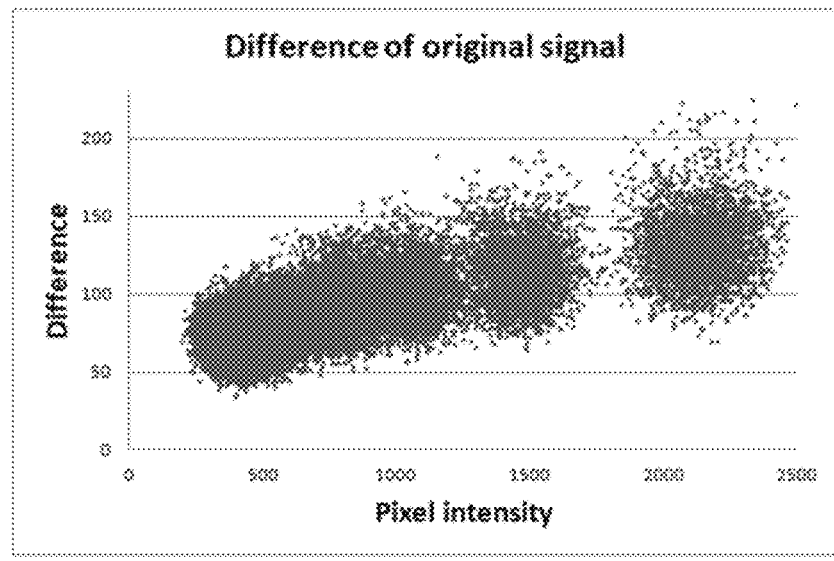
FIGS. 5A and 5B are graphs showing the distribution of pixel values of the substation image of the original signal and the distribution of pixel values of the subtraction image obtained after Anscombe transform with respect to the same input images (previous frame and current frame) of a subject in a stationary state.
Figure 5B:
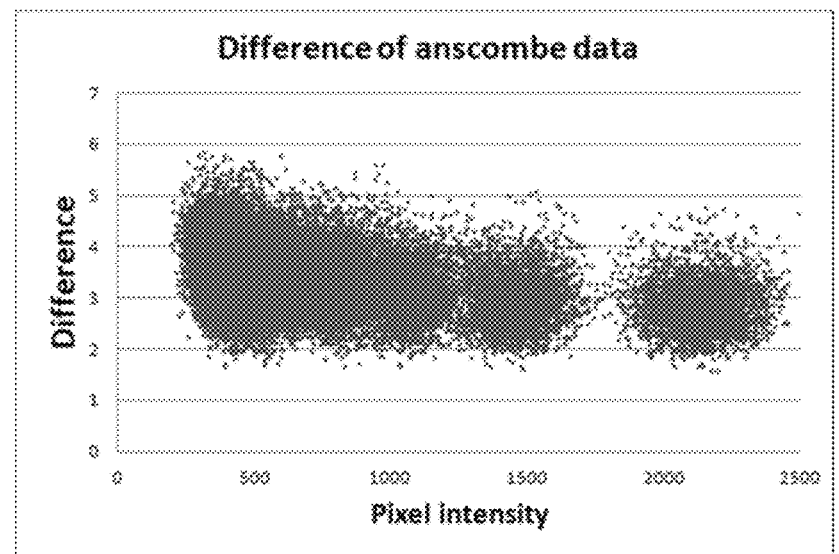

FIGS. 5A and 5B show comparatively the distribution of pixel values of the subtraction image of the original signal and the distribution of pixel values of the subtraction image subjected to Anscombe transform with respect to the same input image (previous frame and current frame) of a subject in a stationary state. FIG. 5A is a graph showing pixel value distribution of a subtraction image obtained from an original signal, and FIG. 5B is a graph showing pixel value distribution of a subtraction image obtained after Anscombe transform of the original signal. In the graph of FIGS. 5A and 5B, a horizontal axis (x-axis) represents a pixel value (intensity), and a vertical axis (y-axis) represents a pixel value difference between pixels of the same position in the previous frame image and the current frame image. Since the subject is stationary, the y-axis direction data distribution of an arbitrary x value can be referred to as noise, and if the y-axis direction data distribution is greater than or equal to the noise value, it can be estimated as a pixel with motion.

For example, when the pixel value is 500 in the distribution of the subtraction image of the original signal, the threshold value for motion determination is appropriately about 100, and when the pixel value is 2200, the threshold value is appropriately about 170. In this way, it is difficult to determine the threshold value because the appropriate threshold value for motion determination varies greatly depending on the pixel value. On the other hand, in the distribution of the subtraction image of the Anscombe transformed signal as shown in FIG. 5B, when the pixel value is 500, the threshold value for motion determination is appropriately about 5, and when the pixel value is 2200, the threshold value is appropriately about 4. In this way, when a subtraction image is generated by subtracting the Anscombe-transformed signals, the difference between the appropriate threshold value depending on the pixel value becomes very small, making it very easy to determine the threshold value. In this case, for example, the threshold value may be set to a value belonging to approximately the upper 70% to 80% of the pixel value difference distribution for a specific pixel value.

Furthermore, even if subtraction data is calculated from the Anscombe-transformed signals, there is still a slight deviation in applying the same threshold value for all pixel values. Considering this point, it is possible to more fairly correct noise deviations for all pixel values through adaptive thresholding. The reason why the subtraction value changes nonlinearly depending on the pixel value is due to the mathematical characteristics of the Anscombe transform.

Figure 6:
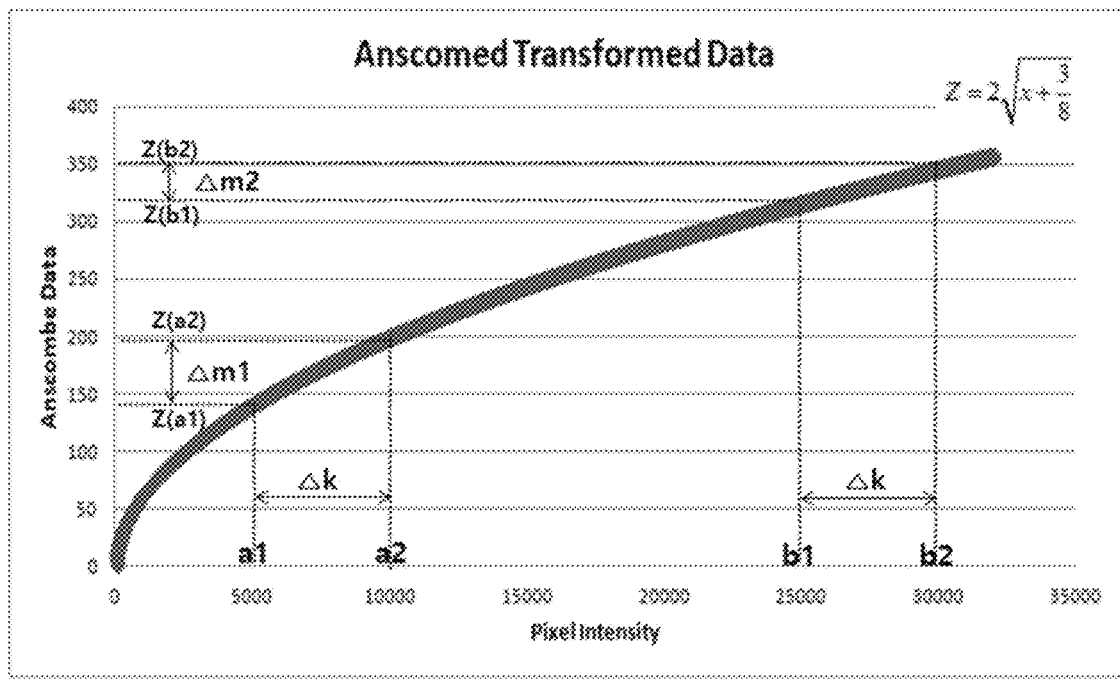
FIG. 6 is a graph showing values after Anscombe transform of each pixel value.

FIG. 6 is a graph showing the value after Anscombe transform of each pixel value, and it can be seen from FIG. 6 that the difference between Anscombe-transformed values decreases as the pixel value increases. For example, in FIG. 6, when the pixel values are a1(5,000), a2(10,000), b1(25,000), and b2(30,000), the Anscombe-transformed data are Z(a1)(141.43), Z(a2)(200.00), Z(b1)(316.23), and Z(b2)(346.41) respectively. At this time, when the pixel value changes from a1 to a2 and from b1 to b2, the pixel value difference $\Delta k$ are the same as 5,000, but the difference of the Anscombe-transformed data is 58.57(=200.00-141.43) when the pixel value changes from a1 to a2 and the difference of the Anscombe-transformed data is when the pixel value changes from b1 to b2.

Figure 7:
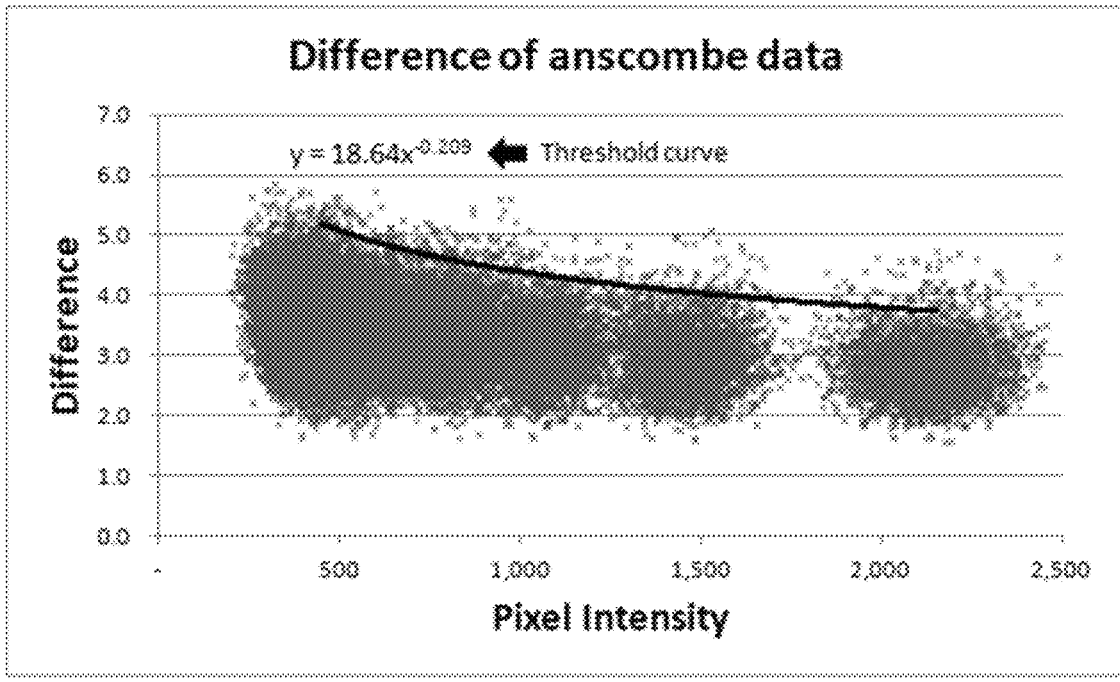
FIG. 7 is a graph showing a result of drawing a trend line after sampling a appropriate threshold value for an arbitrary pixel value in pixel value distribution data of a subtraction image obtained after Anscombe transform in FIGS. 5A and 5B.

In an embodiment of the present invention, in order to complement the characteristics of Anscombe transform, a threshold value reference curve depending on pixel values is experimentally determined in advance and an adaptive thresholding is performed depending on to pixel values. FIG. 7 is a graph showing a result of drawing a trend line after sampling an appropriate threshold value for an arbitrary pixel value in pixel value distribution data of a subtraction image obtained after Anscombe transform in FIGS. 5A and 5B. The trend line was expressed as a form of a power in the form of $y=\alpha \cdot x^{\beta}$, and in FIG. 7 $y=18.64 \cdot x^{-0.209}$ was used as a threshold reference curve.

That is, in an embodiment of the present invention, an adaptive threshold whose size changes depending on the size of a pixel value of each pixel of a subtraction image is applied. For example, a threshold value for motion determination may be set to decrease as a pixel value of a pixel increases.

The thresholding unit 15 determines that each pixel of the subtraction image has a motion if the pixel value is greater than or equal to a predetermined threshold and thus assigns a decision value indicating motion, for example, '0', to the corresponding pixel. Alternatively, if the pixel value is smaller than the threshold value, it is determined that the pixel has no motion, and a determination value representing no motion, for example, '1' may be assigned to the corresponding pixel. The thresholding unit 15 performs such motion determination using the threshold value for all pixels of the subtraction image and assigns a determination value based on the determination result to the corresponding pixel to generate a motion detection image. The thresholding unit 15 generates a motion detection image using the subtraction image and the threshold reference curve in this way. Accordingly, the motion detection image has the same pixels as the input frame image and has a value for whether each pixel has motion.

Meanwhile, in another embodiment of the present invention, instead of thresholding respective pixels, the thresholding may be performed in mask units including a plurality of adjacent pixels. For example, it is possible to set a mask including 3*3, i.e., 9 pixels surrounding a center pixel and to determine whether a corresponding central pixel has moved by comparing an average value or a median value of pixels in the mask with a threshold value. In this way, while moving the mask, motion determination can be made on a mask-by-mask basis, and a motion detection image can be generated accordingly. When noise is included in a specific pixel, the corresponding noise can be reduced by performing the thresholding in mask units.

As described above, by determining whether each pixel has motion through the thresholding unit 15 and assigning a different value to a pixel determined to have motion and a pixel determined to have no motion, all pixels of the subtraction image have one of predetermined two values, e.g., 0 or 1. The image obtained in this way includes information on whether all pixels have motion or not, and in this sense, this image may be referred to as a motion detection image.

FIGS. 9A to 9C show an example of a motion detection image output when the hand phantom is moved from right to left in the previous frame image and the current frame image. FIG. 9A shows a previous frame image including the hand phantom, and FIG. 9B shows a current frame image in a state where the hand phantom is moved from right to left. FIG. 9C shows an output motion detection image showing a motion detection result for each pixel of the subtraction image.

Referring to FIG. 9C, a region marked in white indicates pixels in which motion is detected, and it can be noted that an area (an edge of a bone region) that has a high contrast with the previous frame within the hand phantom where motion actually exists is detected as motion and that areas (skin area, tool area) with a low contrast with the previous frame is not detected as motion. Accordingly, in generating a final output image in a subsequent process, if the part with motion is updated mainly by the current frame and the remaining part is averaged, noise is reduced and edges are strengthened to improve the sharpness and prevent the motion blur.

Figure 12:
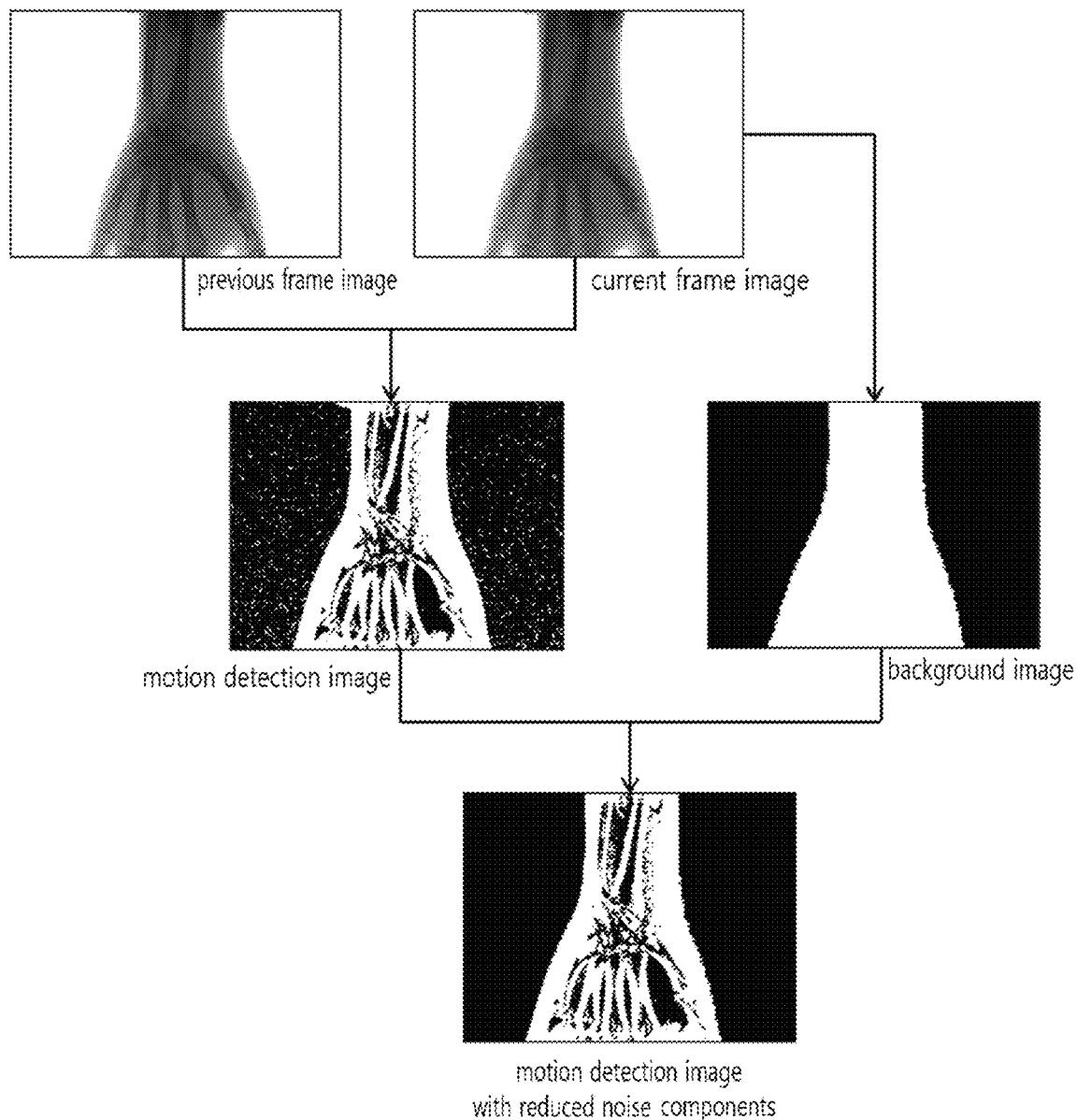
FIG. 12 is a diagram illustrating a method of generating a motion detection image according to another embodiment of the present invention.

Meanwhile, FIG. 12 shows a method of generating a motion detection image according to another embodiment of the present invention. Since noise components may remain in the motion detection image despite the generation of the motion detection image through thresholding according to the noise level of the image in the above-described embodiment, additional noise reduction processing is performed in this embodiment.

In this embodiment, after separating the subject and the background, remaining noise is removed by excluding the background area from the motion detection image. In the current frame image, by experimentally applying a threshold value or through artificial intelligence learning, a background image in which the subject has been removed is generated and adding or multiplying a motion detection image generated by the above-described embodiment and the generated background image, a motion detection image from which noise components are removed is generated. Accordingly, a motion detection image including only information about the motion of a subject may be generated while removing noise components remaining in the background. This method has an advantage of being able to sensitively detect the movement of a subject while reducing the noise level of the entire image when the motion detection threshold is lowered.

Meanwhile, in another embodiment of the present invention, when a threshold for motion detection is set, two motion detection images are generated by dividing a background and a subject area and applying different thresholds, and then the generated two motion detection images may be merged to generate a final motion detection image.

A motion probability image generating unit 16 generates a motion probability image by accumulating the motion detection results in a separate memory in chronological order based on the motion detection results. The motion probability image is used to determine an appropriate mixing ratio between the previous frame image and the current frame image to generate the final output image.

FIG. 10 is a drawing illustrating a method of generating a motion probability image using a motion detection image. The motion probability image generating unit 16 may generate and update a motion probability image by accumulatively storing the motion detection image obtained through motion detection in a separate memory in chronological order for each frame. The image on the left of FIG. 10 represents the accumulated motion detection images, and the right image represents the motion probability image obtained by summing the motion detection images. The motion probability image of the current frame may be generated by adding values of the same pixel of the motion probability image of the previous frame and the motion detection image of the current frame and. That is, the motion probability image of a specific frame is an image obtained by summing the pixel values of the same pixel of all motion detection images obtained up to the corresponding frame. For example, referring to FIG. 10, when the current frame is the 4th frame, the sum of the values of the same pixels in the motion detection images obtained in the previous 4 frames is the pixel value of the same pixel of the motion probability image of the current frame.

If the value of a pixel determined to have motion in a motion detection image is set to '0' to express the corresponding pixel to be bright and the value of a pixel determined to have no motion is set to '1' to express the corresponding pixel to be dark, each pixel in the motion probability image has a pixel value equal to the sum of the motion detection values (0 or 1) of the corresponding pixel, and thus has a different value, that is, a different brightness depending on the number of times of motion determination. For example, assuming a motion probability image consisting of 10 frames, the motion probability image is obtained by summing 10 motion detection images, and each pixel of the motion probability image has a value between 0 and 10. At this time, if the values of the same pixels in all motion detection images are all 0, the corresponding pixel in the motion probability image has a value of 0, and if all the values of the same pixels in all motion detection images are 1, the corresponding pixel in the motion probability image has a value of 10. As a result, as shown in FIG. 10, each pixel of the motion probability image has a pixel value, that is, a brightness depending on the number of motion detections of the same pixel of the motion detection image up to the corresponding frame.

In this sense, it can be noted that the brighter the pixel value in the generated motion probability image, the higher the motion probability is, and the darker the motion probability is. For example, when a motion is detected while a frame progresses in chronological order at the same pixel position, the motion probability becomes high, and when no motion is detected, the motion probability becomes low.

The value of each pixel of the motion probability image represents the degree of motion, i.e., the motion probability value of the corresponding pixel. That is, if a decision value of '0' is assigned when there is motion and '1' is assigned when there is no motion, the smaller the pixel value of the motion probability image is, and the greater the motion probability of the corresponding pixel is.

Figure 11:
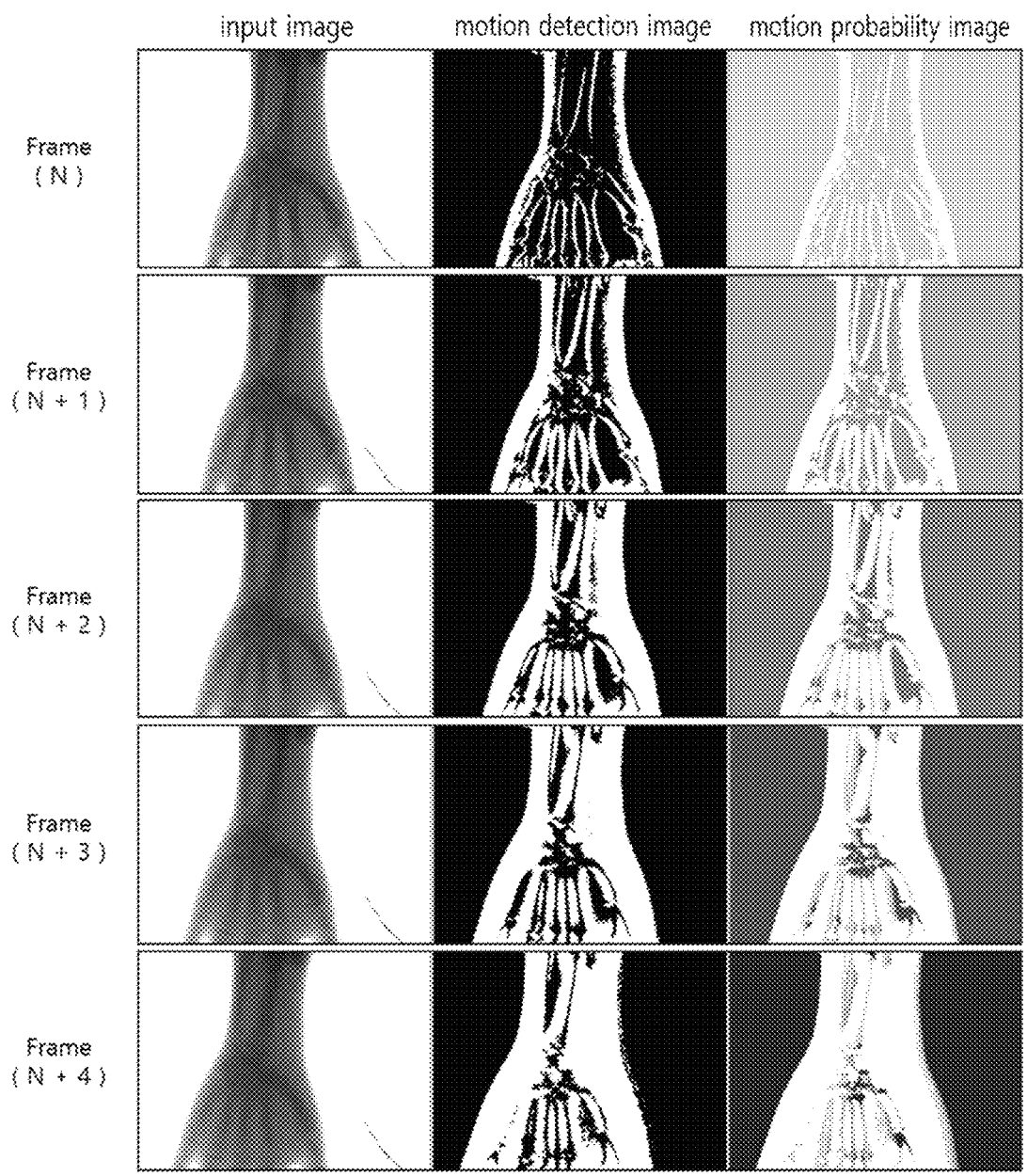
FIG. 11 is a diagram illustrating generation of a motion detection image and a motion probability image according to an input image as frames progress.

FIG. 11 illustrates an example of a process of generating a motion detection image and a motion probability image according to an input image as frames progress. A motion detection image may be generated by a subtraction of a frame image of each frame and a previous frame image, and a motion probability image may be generated by summing the motion detection image and the motion probability image of the previous frame.

An output image generating unit 17 generates an output image by mixing the current frame image and the previous frame image. Here, the current frame image may be a current frame image that is undergone noise reducing by the noise reducing unit 12, and the previous frame image may be a previous frame output image or a previous frame output image that is undergone noise reducing by the noise reducing unit 12. At this time, the output image generating unit 17 generates a final output image by mixing the current frame image and the output image of the previous frame with an appropriate mixing ratio based on the motion probability image. The reflection ratio of the current frame image may be set to relatively increase as the degree to which the value of each pixel of the motion probability image indicates motion increases. That is, the mixing ratio may be determined so that the weight of the current frame increases as the motion probability determined by the pixel value included in the motion probability image increases. For example, the reflection ratio of the current frame image may be determined such that the reflection ratio of the current frame image linearly increases as the degree to which a pixel value of the motion probability image indicates motion in a pixel unit increases.

As a specific example, for a pixel with a lot of motion, a predetermined weight $\alpha_1$, e.g., 0.8, is assigned to the corresponding pixel of the current frame image, and a weight $1-\alpha_1$, e.g., 0.2, is assigned to the corresponding pixel of the output image accumulated up to the previous frame, and such mixing processes are performed for all pixels, and thereby a current frame image and a previous frame output image may be mixed. On the other hand, for pixels with little motion, a predetermined weight $\alpha_2$, e.g., 0.2, is assigned to the corresponding pixel of the current frame image, and a weight $1-\alpha_2$, e.g., 0.8, is assigned to the corresponding pixel of the output image accumulated up to the previous frame, and thus the current frame image and the previous frame output image may be mixed. If the weight of the current frame is increased for pixels with many motions, an image without motion blur can be obtained. As a result, based on the motion probability, in the final output image, pixels with high motion are updated by reflecting more values of the current frame, and pixels with less motion are updated by reflecting more values of the previous frame, so that frames are accumulated over time and as a result noise reduction performance can be improved.

After finally outputting an image with reduced noise, the result is stored in a memory and used as an image of a previous frame when generating an output image of a next frame to implement a recursive filtering mechanism.

Although preferred embodiments of the present invention have been described in detail above, the scope of the present invention is not limited thereto, and various modifications and improvements by those skilled in the art using the basic concept of the present invention as defined in the following claims are also within the scope of the invention.

What is claimed is:

1. An image processing apparatus configured to perform noise reduction on an image obtained by radiography in a recursive way, comprising:
   an image input unit receiving frame-by-frame images obtained by the radiography;
   a motion detection image generating unit configured to generate a motion detection image comprising motion detection information for each pixel of a subtraction image obtained by a subtraction of a current frame image and a previous frame image;
   a motion probability image generating unit configured to generate a motion probability image based on the generated motion detection image and the motion detection image accumulated up to a previous frame; and
   an output image generating unit configured to generate an output image of a current frame by mixing the current frame image and an output image of the previous frame based on the motion probability image,
   wherein the motion probability image generating unit generates the motion probability image by summing a motion detection image of the current frame and at least one of motion detection images up to the previous frame, and
   wherein the output image generating unit variably determines a mixing ratio between the current frame image and the previous frame image depending on a value indicating a degree of a motion of each pixel of the motion probability image.

2. The image processing apparatus of claim 1, wherein the mixing ratio is determined such that a reflection ratio of the current frame image compared to the previous frame image increases as the degree of the motion represented by each pixel value of the motion probability image increases.

3. The image processing apparatus of claim 1, wherein the output image generating unit generates the output image of the current frame by mixing the current frame image and the previous frame image in corresponding pixel units depending on the value of each pixel of the motion probability image.

4. An image processing apparatus configured to perform noise reduction on an image obtained by radiography in a recursive way comprising:
   an image input unit receiving frame-by-frame images obtained by the radiography;
   a motion detection image generating unit configured to generate a motion detection image comprising motion detection information for each pixel of a subtraction image obtained by a subtraction of a current frame image and a previous frame image;
   a motion probability image generating unit configured to generate a motion probability image based on the generated motion detection image and the motion detection image accumulated up to a previous frame;
   an output image generating unit configured to generate an output image of a current frame by mixing the current frame image and an output image of the previous frame based on the motion probability image; and
   a noise reducing unit configured to perform a noise reduction processing on the current frame image and the previous frame image,
   wherein the noise reducing unit performs the noise reduction processing in a unit of a mask having a plurality of adjacent pixels, and
   wherein the noise reducing unit is configured to perform the noise reduction processing based on a combination having a smallest sum of absolute values of a difference between a center pixel of the plurality of the pixels and adjacent pixels among combinations of the center pixel of the plurality of the pixels and the adjacent pixels neighboring the center pixel in a predetermined direction.

5. The image processing apparatus of claim 4, further comprising a noise stabilizing unit is configured to perform a noise stabilization by reducing a noise deviation between the current frame image on which the noise reduction process is performed and the previous frame image.

6. The image processing apparatus of claim 5, wherein the noise stabilizing unit is configured to perform the noise stabilization by converting the current frame image and the previous frame image to have Gaussian distribution characteristics.

7. The image processing apparatus of claim 5, wherein the noise stabilizing unit is configured to perform the noise stabilization through a conversion that reduces the noise deviation.

8. The image processing apparatus of claim 1, wherein the motion detection image generating unit is configured to remove noise by separating a subject and a background region from the generated motion detection image and then excluding the background region from the motion detection image.

9. An image processing apparatus configured to perform noise reduction on an image obtained by radiography in a recursive way, comprising:
   an image input unit receiving frame-by-frame images obtained by the radiography;
   a motion detection image generating unit configured to generate a motion detection image comprising motion detection information for each pixel of a subtraction image obtained by a subtraction of a current frame image and a previous frame image;
   a motion probability image generating unit configured to generate a motion probability image based on the generated motion detection image and the motion detection image accumulated up to a previous frame;
   an output image generating unit configured to generate an output image of a current frame by mixing the current frame image and an output image of the previous frame based on the motion probability image;
   a noise reducing unit that is configured to perform a noise reduction processing on the current frame image and the previous frame image; and
   a noise stabilizing unit that is configured to perform a noise stabilization by reducing a noise deviation between the current frame image on which the noise reduction process is performed and the previous frame image,
   wherein the motion detection image generating unit comprises:
   a subtraction image generating unit that is configured to generate a subtraction image by a subtraction of the current frame image and the previous frame image; and
   a thresholding unit that is configured to generate the motion detection image including the motion detection information of each pixel through thresholding on pixel values of each pixel of the subtraction image.

10. The image processing apparatus of claim 9, wherein the thresholding unit is configured to perform thresholding of the motion detection image through an adaptive threshold value having a size that varies depending on a size of a pixel value of each pixel of the subtraction image.

11. The image processing apparatus of claim 10, wherein the thresholding unit is configured to perform the thresholding in units of masks including a plurality of pixels.

12. An image processing apparatus configured to perform noise reduction on an image obtained by radiography in a recursive way, comprising:
   an image input unit receiving frame-by-frame images obtained by the radiography;
   a motion detection image generating unit configured to generate a motion detection image comprising motion detection information for each pixel of a subtraction image obtained by a subtraction of a current frame image and a previous frame image;
   a motion probability image generating unit configured to generate a motion probability image based on the generated motion detection image and a motion detection image accumulated up to a previous frame; and
   an output image generating unit configured to generate an output image of a current frame by mixing the current frame image and the output image of the previous frame based on the motion probability image,
   wherein the motion detection image generating unit is configured to distinguish between a subject and a background region and to generate a subject motion detection image for the subject and a background region motion detection image for the background region through thresholding with different threshold values, and then is configured to generate the motion detection image by merging the subject motion detection image and the background region motion detection image.

13. An image processing method for performing noise reduction on an image obtained by radiography in a recursive way, comprising:
   receiving frame-by-frame images obtained by the radiography;
   generating a motion detection image comprising motion detection information for each pixel of a subtraction image obtained by a subtraction of a current frame image and a previous frame image;
   generating a motion probability image based on the generated motion detection image and a motion detection image accumulated up to a previous frame; and
   generating an output image of a current frame by mixing the current frame image and an output image of the previous frame based on the motion probability image,
   wherein the motion probability image is generated by summing the motion detection image of the current frame and at least one of motion detection images up to the previous frame, and
   wherein a mixing ratio between the current frame image and the previous frame image is variably determined depending on a value indicating a degree of a motion of each pixel of the motion probability image.

14. The image processing method of claim 13, wherein the mixing ratio is determined such that a reflection ratio of the current frame image compared to the previous frame image increases as the degree of the motion represented by each pixel value of the motion probability image increases.

15. The image processing method of claim 13, wherein the output image is generated by mixing the current frame image and the previous frame image in corresponding pixel units depending on the value of each pixel of the motion probability image.

16. The image processing method of claim 13, further comprising performing a noise reduction processing on the current frame image and the previous frame image.

17. The image processing method of claim 16, wherein the noise reduction processing is performed in a unit of a mask having a plurality of adjacent pixels, and
   wherein the noise reduction processing is performed based on a combination having a smallest sum of absolute values of a difference between a center pixel of the plurality of the pixels and adjacent pixels among combinations of the center pixel of the plurality of the pixels and the adjacent pixels neighboring the center pixel in a predetermined direction.

18. The image processing method of claim 16, further comprising performing a noise stabilization by reducing a noise deviation between the current frame image on which the noise reduction process is performed and the previous frame image.

19. The image processing method of claim 18, wherein the noise stabilization is performed by converting the current frame image and the previous frame image to have Gaussian distribution characteristics.

20. The image processing method of claim 18, wherein the noise stabilization is performed through a conversion that reduces the noise deviation.

21. The image processing method of claim 13, further comprising:
performing a noise reduction processing on the current frame image and the previous frame image; and
performing a noise stabilization by reducing a noise deviation between the current frame image on which the noise reduction process is performed and the previous frame image,
wherein the generating the motion detection image comprises:
generating a subtraction image by a subtraction of the current frame image and the previous frame image; and
generating the motion detection image including the motion detection information of each pixel through thresholding on pixel values of each pixel of the subtraction image.

22. The image processing method of claim 21, wherein the thresholding is performed through an adaptive threshold value having a size that varies depending on a size of a pixel value of each pixel of the subtraction image.

23. The image processing method of claim 22, wherein the thresholding is performed in units of masks including a plurality of pixels.

24. The image processing method of claim 13, wherein the generating the motion detection image comprises removing noise by separating a subject and a background region from the generated motion detection image and then excluding the background region from the motion detection image.

25. An image processing method for performing noise reduction on an image obtained by radiography in a recursive way, comprising:
receiving frame-by-frame images obtained by the radiography;
generating a motion detection image comprising motion detection information for each pixel of a subtraction image obtained by a subtraction of a current frame image and a previous frame image;
generating a motion probability image based on the generated motion detection image and a motion detection image accumulated up to a previous frame; and
generating an output image of a current frame by mixing the current frame image and an output image of the previous frame based on the motion probability image,
wherein the generating the motion detection image comprises distinguishing between a subject and a background region and generating a subject motion detection image for the subject and a background region motion detection image for the background region through thresholding with different threshold values, and then generating the motion detection image by merging the subject motion detection image and the background region motion detection image.

\* \* \* \* \*